US009511494B2

(12) United States Patent
Noh et al.

(10) Patent No.: US 9,511,494 B2
(45) Date of Patent: Dec. 6, 2016

(54) ROBOT CLEANER AND CONTROLLING METHOD OF THE SAME

(71) Applicant: LG ELECTRONICS INC., Seoul (KR)

(72) Inventors: Dongki Noh, Seoul (KR); Seungmin Baek, Seoul (KR); Jeongsuk Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 13/920,612

(22) Filed: Jun. 18, 2013

(65) Prior Publication Data

US 2013/0338831 A1    Dec. 19, 2013

(30) Foreign Application Priority Data

Jun. 18, 2012    (KR) .................. 10-2012-0065153

(51) Int. Cl.
*B25J 9/16*    (2006.01)
*B25J 9/00*    (2006.01)
*G05D 1/02*    (2006.01)

(52) U.S. Cl.
CPC .............. *B25J 9/1676* (2013.01); *B25J 9/0003* (2013.01); *B25J 9/1697* (2013.01); *G05D 1/0248* (2013.01); *G05D 2201/0203* (2013.01)

(58) Field of Classification Search
CPC .. G05D 1/0274; G05D 1/024; G05D 1/0246; G05D 2201/0203; G05D 1/0248; G05D 2201/0215; G05D 1/0214; G05D 1/0251; G05D 1/0253; G01B 11/25; G01B 11/00; G01B 11/303; G01C 15/002; G01C 21/005; G01C 11/06; G01C 21/00; G01C 21/32; A47L 2201/04; A47L 2201/00; A47L 2201/06

See application file for complete search history.

(56) References Cited

U.S. PATENT DOCUMENTS

| 4,954,962 | A | * | 9/1990 | Evans, Jr. .............. G01C 21/00 180/169 |
| 6,327,090 | B1 | * | 12/2001 | Rando et al. ................. 359/618 |
| 6,728,608 | B2 | * | 4/2004 | Ollis et al. ...................... 701/28 |
| 2005/0166354 | A1 | * | 8/2005 | Uehigashi ....................... 15/319 |
| 2007/0100498 | A1 | * | 5/2007 | Matsumoto ............ G05D 1/024 700/245 |
| 2007/0267570 | A1 | | 11/2007 | Park et al. |

FOREIGN PATENT DOCUMENTS

| EP | 0 358 628 A2 | 3/1990 |
| WO | WO 2004/095071 A2 | 11/2004 |
| WO | WO 2007/051972 A1 | 5/2007 |

OTHER PUBLICATIONS

Point—A place or locality.pdf (The Free Dictionary, point—definition of point by the Free Dictionary, Apr. 10, 2015, http://www.thefreedictionary.com/point, pp. 1-33).*

(Continued)

*Primary Examiner* — Bao Long T Nguyen
(74) *Attorney, Agent, or Firm* — Ked & Associates LLP (57) ABSTRACT

A robot cleaner is provided. The robot cleaner may precisely detect a peripheral obstacle using a particular optical pattern. An asymmetric cross-shaped optical pattern may be irradiated, and a pattern image with respect to the optical pattern-irradiated region may be analyzed to determine whether or not an obstacle is in the moving path, and a width or a height of the obstacle. Further, the robot cleaner may perform operations such as a forward motion, a backward motion, a stopping motion and a detour motion, based the obstacle detection result.

16 Claims, 7 Drawing Sheets

(56) References Cited

OTHER PUBLICATIONS

Point—ParticularPlace.pdf (Free Merriam-Webster Dictionary, Point—Definition and More from the Free Meriam-Webster Dictionary, Apr. 10, 2015, http://www.merriam-webster.com/dictionary/point, pp. 1-10).*

Point_A particular spot_place_or_position.pdf (Oxford Dictionary, point: definition of point in Oxford dictionary (American English) (US), Apr. 10, 2015, http://www.oxforddictionaries.com/us/definition/american_english/point, pp. 1-33).*

European Search Report dated Oct. 25, 2013 for corresponding Application No. 13172023.7.

* cited by examiner

ROBOT CLEANER AND CONTROLLING METHOD OF THE SAME

CROSS-REFERENCE TO RELATED APPLICATION(S)

This application claims priority under 35 U.S.C. §119 to Korean Application No. 10-2012-0065153 filed on Jun. 18, 2012, whose entire disclosure is hereby incorporated by reference.

BACKGROUND

1. Field

This relates to a robot cleaner, and particularly, to a robot cleaner capable of detecting an obstacle.

2. Background

Robots have been developed for industrial use, and may manage some parts of factory automation. Robots may be applied to various fields, such as medical robots, space robots, home robots, and others. A home robot may perform a cleaning operation by sucking dust or foreign materials while moving within a predetermined region. Such a robot cleaner may include a chargeable battery, and an obstacle sensor for avoiding obstacles while moving to perform a cleaning operation autonomously.

BRIEF DESCRIPTION OF THE DRAWINGS

The embodiments will be described in detail with reference to the following drawings in which like reference numerals refer to like elements wherein.

DETAILED DESCRIPTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
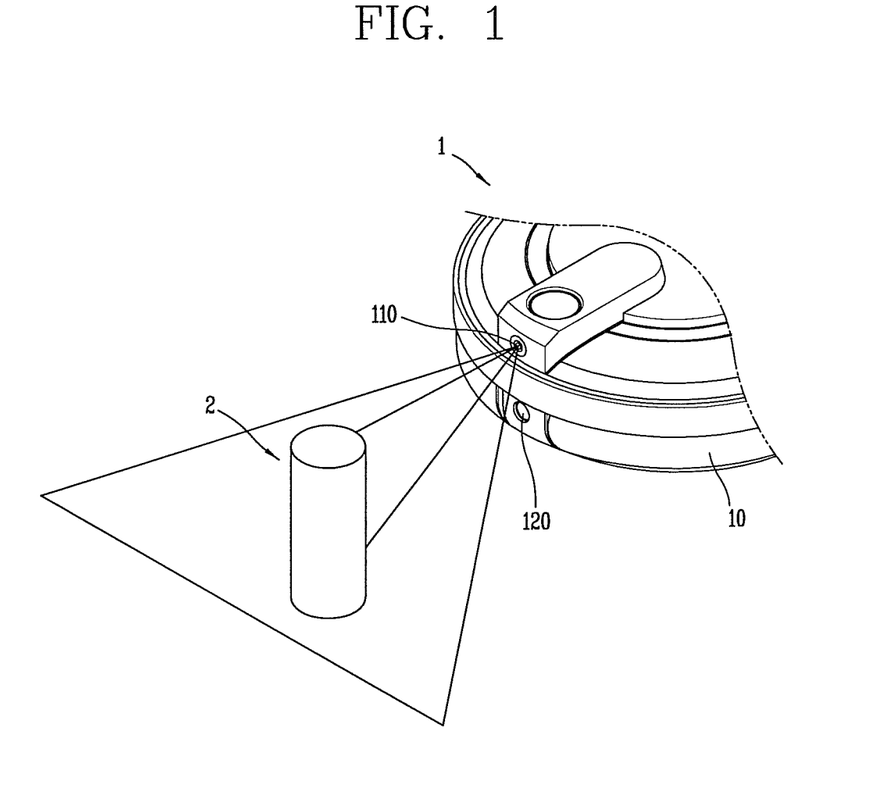
FIG. 1 is a partial perspective view of a mobile terminal according to embodiments as broadly described herein.
Figure 2:
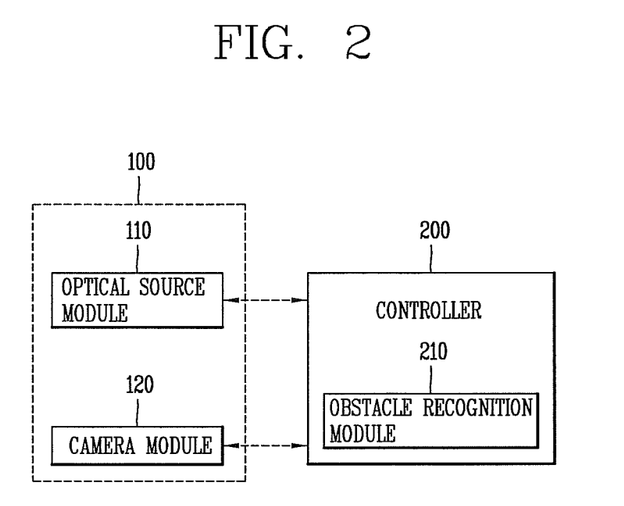
FIG. 2 is a block diagram of a robot cleaner according to an embodiment as broadly described herein.

Referring to FIGS. 1 and 2, a robot cleaner 1 according to an embodiment as broadly described herein may include a body 10 which forms an external appearance of the robot cleaner, an optical pattern sensor 100, and a controller 200.

The optical pattern sensor 100 is provided on a front surface of the body 10, and is configured to irradiate an optical pattern and to output a pattern image. As shown in FIG. 2, the optical pattern sensor 100 may include an optical source module 110 configured to irradiate one or more cross-shaped optical patterns forward from a front side of the body 10, and a camera module 120 configured to capture a pattern image on the optical pattern-irradiated region. The optical source module 110 comprises a laser diode (LD), a light emitting diode (LED), etc. The optical pattern sensor 100 may further include an additional lighting in addition to or instead of the optical source module 110. The camera module 120 may be provided at the optical pattern sensor 100 and include one, two or more cameras. The camera module 120 may be a structured light camera, and the optical pattern sensor 100 may include a laser vision sensor. The optical pattern sensor 100 may further include a filter connected to a front end of the optical source module, and configured to pass only a prescribed frequency therethrough among optical patterns irradiated from the optical source module.

The optical pattern may be implemented as a cross-shaped optical pattern, or combination of a plurality of optical patterns. In certain embodiments, the optical pattern is implemented as an asymmetrical cross-shaped optical pattern in which a horizontal length is longer than a vertical length. More specifically, the optical pattern sensor 100 is configured to irradiate an asymmetric cross-shaped optical pattern in which a horizontal length is longer than a vertical length. Alternatively, the optical pattern sensor 100 may be configured to irradiate a cross-shaped optical pattern in which a horizontal length is the same as a vertical length, or a cross-shaped optical pattern in which a horizontal length is shorter than a vertical length. Here, the horizontal pattern may be set so that the robot cleaner can scan an obstacle within a wide range. The vertical pattern may be set to have a length, based on a value equal to or larger than the height of the robot cleaner. Accordingly, the vertical pattern may be shorter than the horizontal pattern. The vertical pattern and the horizontal pattern may be combined with each other in various manners, and a plurality of vertical patterns may be coupled to a single horizontal pattern. In a case where an optical pattern is irradiated in a conical shape, a longest part of the optical pattern, e.g., a diameter of a circle or a long axis of an oval (ellipse) serves as a length of a horizontal pattern or a vertical pattern.

Referring to FIG. 2, the controller 200 may include an obstacle recognition module 210 configured to recognize an obstacle by processing a pattern image.

The obstacle recognition module 210 may recognize whether an obstacle exists or not, or may recognize a width of an obstacle using a horizontal pattern of a pattern image. For instance, the obstacle recognition module 210 may recognize a width of an obstacle after the robot cleaner consecutively irradiates optical patterns while moving. Here, the obstacle recognition module 210 may recognize a width of an obstacle according to a bending degree of a horizontal pattern, or according to an angle formed by two lines and the obstacle recognition module 210, the lines extending from two side edges of a horizontal pattern up to the horizontal pattern. Alternatively, the obstacle recognition module 210 may recognize a height of an obstacle using a horizontal pattern of a pattern image. For instance, the obstacle recognition module 210 may check a position of a horizontal pattern from a pattern image having no obstacle, and then calculate a moving distance of the horizontal pattern when an obstacle exists, thereby recognizing a height of the obstacle.

When using only a horizontal pattern, there may be some limitations in recognizing a height of an obstacle. In this case, the obstacle may be erroneously recognized. Accordingly, the obstacle recognition module 210 may adapted to precisely recognize a height of an obstacle using a vertical pattern, or using both a vertical pattern and a horizontal pattern.

Figure 3A:
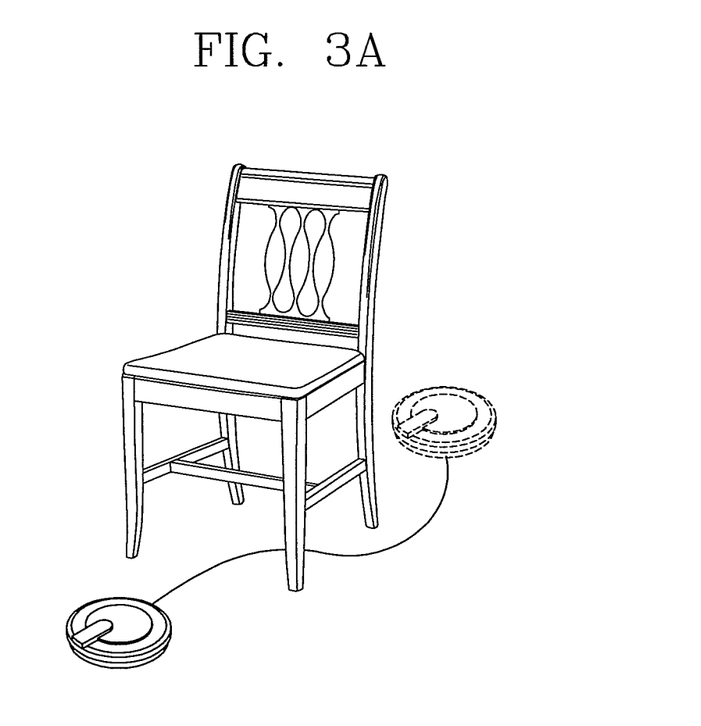
FIGS. 3A to 3C illustrate operation of a robot cleaner based on an obstacle detection result.
Figure 3B:
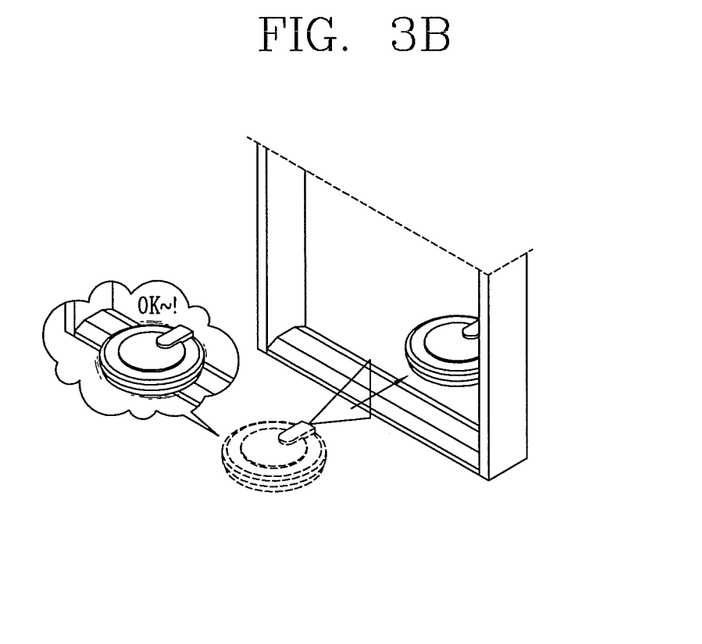
Figure 3C:
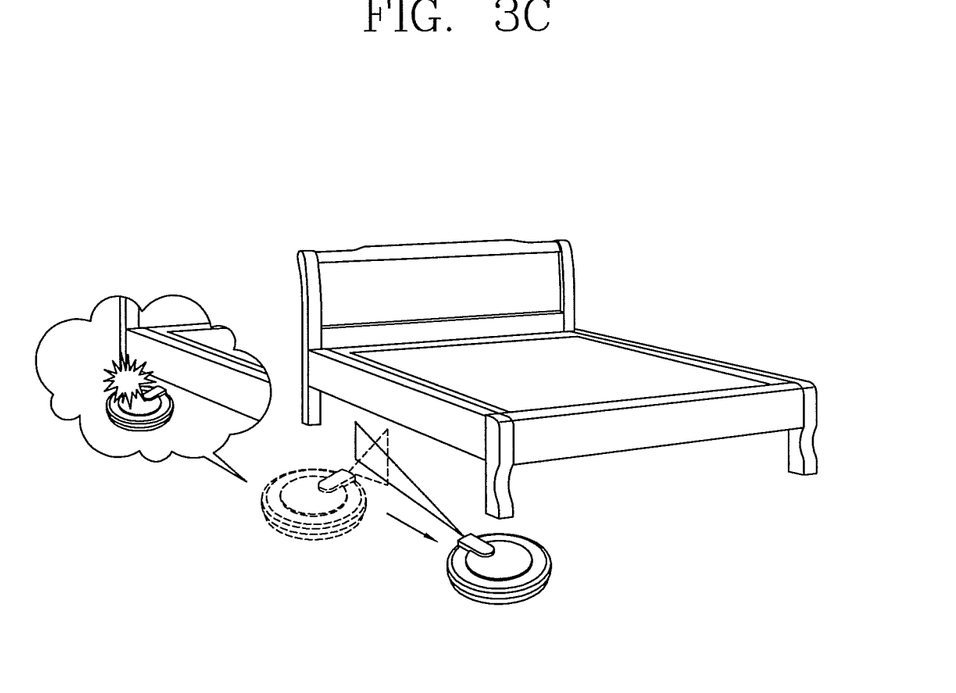

FIG. 3A illustrates a case in which the obstacle is implemented as a chair having legs of a height greater than a prescribed value. The robot cleaner may move while avoiding the legs, and may pass through the chair because the legs have a prescribed height. FIG. 3B illustrates a case in which the obstacle is a low threshold. The robot cleaner irradiates optical patterns forward to recognize a threshold. Then the robot cleaner passes through the threshold if it determines that the threshold is passable. FIG. 3C illustrates a case in which the obstacle is a bed frame. The robot cleaner recognizes a bed frame based on a pattern image obtained after irradiating optical patterns. If it is determined that the bed frame is too low to pass under, the robot cleaner detours around the bed frame. Accordingly, the robot cleaner may avoid being caught (trapped) in an obstacle such as a bed, furniture, or an electronic product, each having too small a gap for the robot cleaner to pass through.

The robot cleaner may further include an image detector configured to capture a peripheral image and to output image information. The controller 200 further includes a position recognition module configured to recognize a position of the robot cleaner using image information output from the image detector. The controller 200 may further comprise a map creation module configured to create a peripheral map using a recognized position of the robot cleaner.

Figure 5:
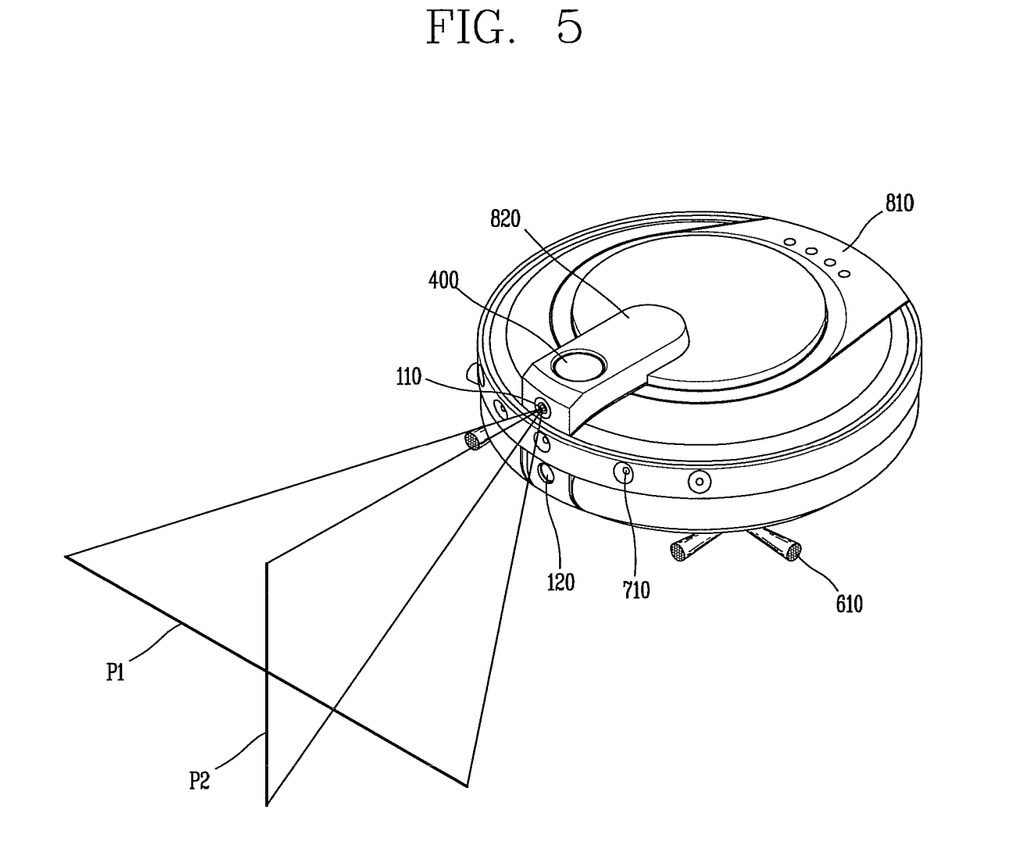
FIG. 5 is a perspective view of a robot cleaner according to an embodiment as broadly described herein.
Figure 6:
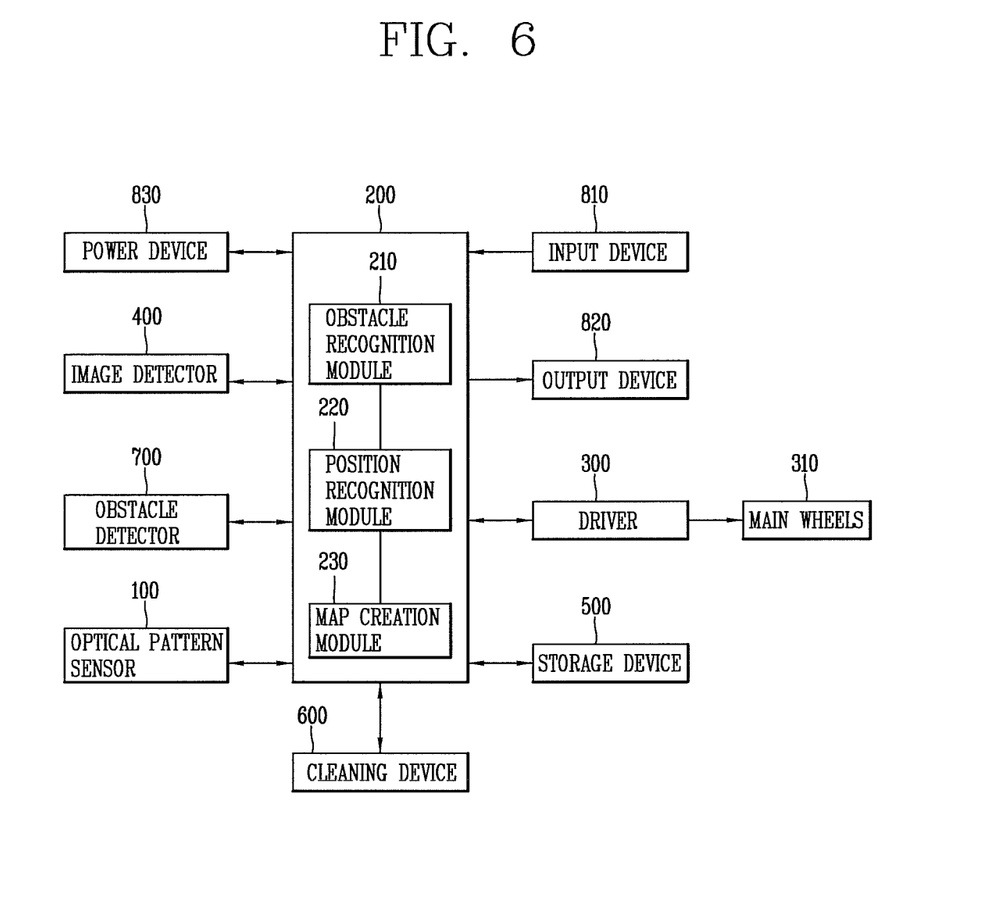
FIG. 6 is a block diagram of the robot cleaner shown in FIG. 5.

FIGS. 5 and 6 are views illustrating a robot cleaner according to an embodiment as broadly described herein. The configuration of the robot cleaner may be applied to another robot cleaner. Referring to FIG. 5 or FIG. 6, the robot cleaner further includes an image detector 400 configured to capture a peripheral image and to output image information, besides the optical pattern sensor 100 and the controller 200. The image detector 400 is provided with a camera sensor installed toward the upper side or the front side. If the image detector 400 is provided with a plurality of camera sensors, the camera sensors may be formed on an upper surface or a side surface of the robot cleaner, at constant intervals or at constant angles. Referring to FIG. 5, a single camera sensor is installed toward the front side. The image detector 400 may further include a lens connected to the camera sensor and focusing a camera on a subject, a camera controller configured to control the camera sensor, and a lens controller configured to control the lens. As the lens, preferably used is a lens having a wide view angle so that all the peripheral regions, e.g., all the regions on the ceiling may be captured at a predetermined position. A position recognition module 220 may be configured to extract feature points from image information captured by the image detector 400, and to recognize a position of the robot cleaner based on the feature points. A map creation module 230 may be configured to create a map with respect to a cleaning region using the position of the robot cleaner recognized by the position recognition module 220. The map creation module 230 may update or compensate for a created peripheral map by reflecting an obstacle recognized by the optical pattern sensor, to the peripheral map.

Figure 7:
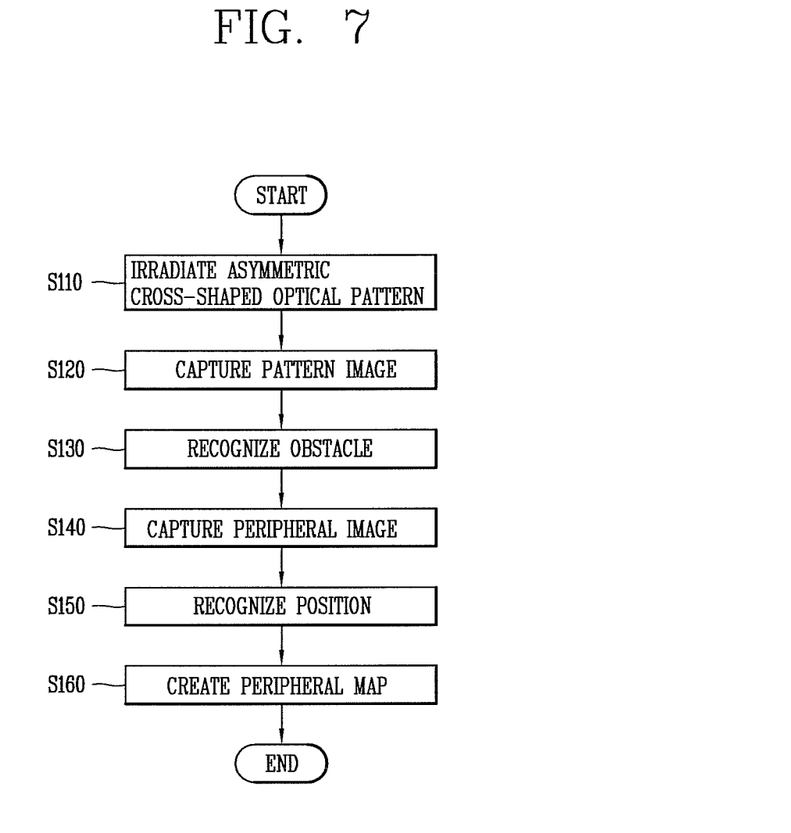
FIGS. 7 and 8 are flowcharts of a method for controlling a robot cleaner according to embodiments as broadly described herein.

Referring to FIG. 7, the robot cleaner irradiates optical patterns while moving or in a stopped state (S110). As aforementioned, the optical pattern may be implemented as an asymmetric cross-shaped optical pattern. Then the robot cleaner captures a pattern image with respect to the optical pattern-irradiated region, thereby acquiring the pattern image (S120). Then the robot cleaner recognizes an obstacle using the pattern image (S130). Here, the robot cleaner recognizes an obstacle by processing the pattern image using a controller such as a micro computer. Alternatively, the optical pattern sensor itself may be configured to recognize an obstacle. For instance, the robot cleaner may recognize whether an obstacle exists or not, a width of an obstacle, a height of an obstacle, etc. based on a horizontal pattern. Further, the robot cleaner may detect a precise height of an obstacle based on a vertical pattern. The robot cleaner may capture a peripheral image (S140). Then the robot cleaner may extract feature points from the peripheral image, thereby recognizing its position based on the feature points (S150). Further, the robot cleaner may create a peripheral map based on the recognized position (S160).

Figure 4:
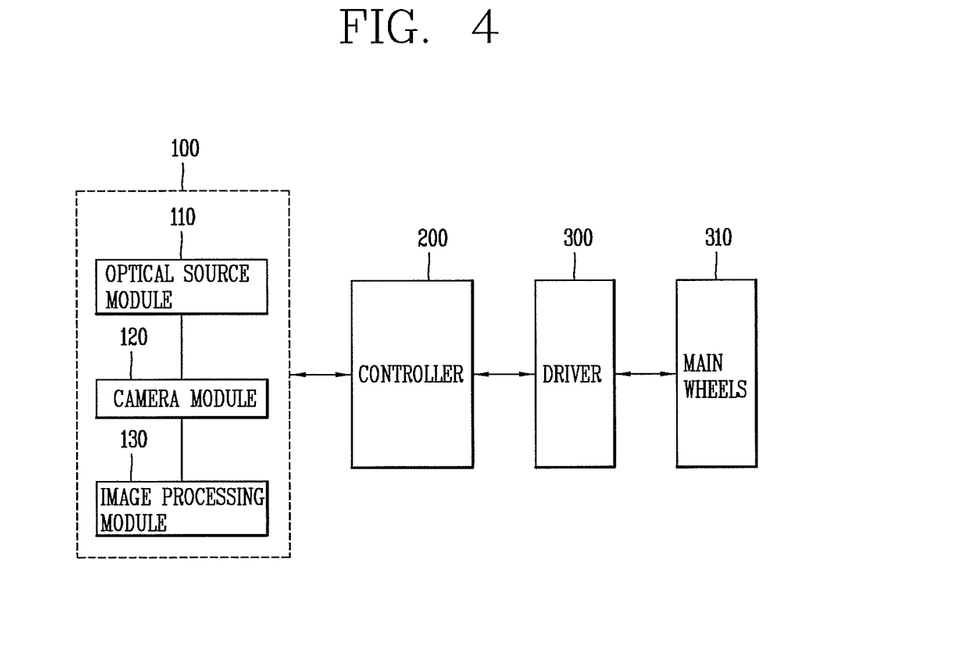
FIG. 4 is a block diagram of a robot cleaner according to another embodiment as broadly described herein.

Referring to FIG. 4, a robot cleaner according to another embodiment may include a body 10 which forms an appearance of the robot cleaner, a driver 300, an optical pattern sensor 100, and a controller 200.

The optical pattern sensor 100 is provided on a front surface of the body 10, and is configured to irradiate one or more cross-shaped optical patterns forward from the front side of the body 10 to thus output a pattern image. Referring to FIG. 4, the optical pattern sensor 100 includes an optical source module 110 configured to irradiate one or more cross-shaped optical patterns forward from a front side of the body, and a camera module 120 configured to capture the pattern image on the optical pattern-irradiated region. The optical pattern sensor 100 further includes an image processing module 130 configured to detect an obstacle by processing a pattern image. That is, the obstacle recognition module 210 may be included in the controller 200. Alternatively, the image processing module 130 may be included in the optical pattern sensor 100.

The optical pattern may be implemented as a cross-shaped optical pattern, or combination of a plurality of optical patterns. In certain embodiments, the optical pattern is implemented as an asymmetrical cross-shaped optical pattern in which a horizontal length is longer than a vertical length. More specifically, the optical pattern sensor 100 is configured to irradiate an asymmetric cross-shaped optical pattern in which a horizontal length is longer than a vertical length.

The optical source module 110 and the camera module 120 will not be explained, because they were aforementioned in a previous embodiment. The image processing module 130 detects an obstacle by processing an image acquired by one or more camera modules. The image processing module 130 may detect an obstacle using a shape, an area, a change, etc. of an irradiated optical pattern, from an image. The image processing module 130 detects a size, a width, a height, etc. of an obstacle from a patter image including a horizontal pattern and a vertical pattern. As another example, the image processing module 130 may extract one pattern component in a prescribed direction (e.g., X-direction) from an image captured by the camera module 120, then convert the captured image into another direction, and extract another pattern component in the prescribed direction (e.g., X-direction), thereby detecting an obstacle. When using two camera modules, the image processing module 130 may extract only a vertical component from an image captured by one camera module, and may extract only a horizontal component from an image captured by another camera module. Then the image processing module 130 may create a three-dimensional (3D) pattern, and may detect an obstacle based on the 3D pattern, thereby outputting obstacle information such as a size and a shape of an obstacle, to the controller 200. The optical pattern sensor may further comprise a filter connected to a front end of the optical source module 110, and configured to pass only a prescribed frequency therethrough among optical patterns irradiated from the optical source module 110.

The controller 200 recognizes an obstacle from a pattern image, and generates a driving signal based on a recognition result. The controller 200 may further include an obstacle recognition module 210 configured to recognize an obstacle by processing a pattern image. Alternatively, the controller 200 may generate a driving signal by receiving information about an obstacle detected by the image processing module 130. The robot cleaner further includes an image detector configured to output image information by capturing a peripheral image. The controller 200 further includes a position recognition module configured to recognize a position of the robot cleaner based on image information output from the image detector. The controller 200 may further include a map creation module configured to create a peripheral map using the recognized position of the robot cleaner. The image detector of FIG. 5 or FIG. 6 will not be explained, because it was aforementioned in a previous embodiment.

The driver 300 is provided with a wheel motor for driving one or more wheels installed below the body 10, and is configured to move the body according to a driving signal. The robot cleaner is provided with right and left main wheels 310 at two lower portions thereof. A handgrip may be installed at two side surfaces of the wheels, for facilitation of a user's grasp. The wheel motors are respectively connected to the main wheels 310 to thus rotate the main wheels 310, and can be rotated in two directions in an independent manner. And the robot cleaner is provided with one or more auxiliary wheels on the rear surface thereof. The auxiliary wheels serve to support the body of the robot cleaner, to minimize friction between a lower surface of the body and the floor, and to allow the robot cleaner to smoothly move.

As shown in FIGS. 3A to 3C, the controller 200 generates a driving signal based on a recognition result with respect to an obstacle, and the driver 300 moves the body according to the driving signal. FIG. 3A illustrates a case where the obstacle is a chair having legs of a height more than a prescribed value. The robot cleaner can move while avoiding the legs, and can pass through the chair because the legs have a prescribed height or greater. FIG. 3B illustrates a case where the obstacle is a low threshold. The robot cleaner irradiates optical patterns forward from the front side, to thus recognize the threshold. Then the robot cleaner passes through the threshold if it determines that the threshold is passable. FIG. 3C illustrates a case where the obstacle is a bed frame. The robot cleaner recognizes the bed frame based on a pattern image obtained after irradiating optical patterns. If it is determined that the bed frame is too low to pass through/under, the robot cleaner detours around the bed frame. Accordingly, the robot cleaner may avoid being caught (trapped) in an obstacle such as a bed, furniture, or an electronic product, each having a too small to pass through gap.

FIGS. 5 and 6 are views illustrating a robot cleaner according to an embodiment as broadly described herein. The configuration of the robot cleaner may be applied to another robot cleaner. Referring to FIG. 5 or FIG. 6, the robot cleaner may further include an obstacle detector 700 configured to detect a peripheral obstacle, in addition to the optical pattern sensor.

As shown in FIG. 5, the obstacle detector 700 includes first sensors 710 installed on an outer circumferential surface of the robot cleaner at constant intervals. The obstacle detector 700 may also include second sensors 610 protruding outward from the body. Positions and types of the first sensors 710 and the second sensors 610 may be variable according to a type of the robot cleaner, and the obstacle detector may include various types of sensors. The first sensors 710 are configured to detect an object which exists in a moving direction of the robot cleaner, i.e. an obstacle, and then transmit obstacle information to the controller 200. That is, the first sensors 710 detect protrusions, appliances, furniture, wall surfaces, wall corners, etc, which exist on a moving path of the robot cleaner, and then transmit obstacle information to the controller 200. The first sensor 710 may be implemented as an infrared ray sensor, an ultrasonic sensor, an RF sensor, a geomagnetic sensor, etc. The second sensors 610 detect an obstacle which exists at the front or lateral side, and transmits obstacle information to the controller 200. That is, the second sensors 610 detect protrusions, appliances, furniture, wall surfaces, wall corners, etc, which exist on a moving path of the robot cleaner, and then transmit obstacle information to the controller 200. The second sensor 610 may be implemented as an infrared ray sensor, an ultrasonic sensor, an RF sensor, a position sensitive device (PSD) sensor, etc.

The obstacle detector 700 may further include a cliff sensor installed at the bottom surface of the body, and configured to detect an obstacle which is on the floor, e.g., a cliff. The cliff sensor is configured to obtain stable measurement values regardless of reflectivity of the floor and a color difference. Like the PSD sensor, the cliff sensor may be implemented in the form of an infrared ray module.

The obstacle detector 700 may further include a charging signal sensor for receiving a guide signal transmitted from a charging station. The robot cleaner receives a guide signal transmitted from the charging station using the charging signals sensor, thereby checking a position and a direction of the charging station. The charging station creates a guide signal indicating a direction and a distance so that the robot cleaner can return to the charging station. The robot cleaner receives the guide signal transmitted from the charging station, and determines the current position and sets a moving direction. Then the robot cleaner returns to the charging station. The charging signal sensor may be implemented as an infrared ray sensor, an ultrasonic sensor, a radio frequency (RF) sensor, etc, and may be generally used as an infrared ray sensor.

The robot cleaner may further include wheel sensors connected to the right and left main wheels 310, and sensing RPMs of the right and left main wheels 310. The wheel sensors may be implemented as a rotary encoder. When the robot cleaner moves in a running mode or a cleaning mode, the rotary encoder senses RPMs of the right and left main wheels 310, and outputs the sensed RPMs. The controller 200 may calculate rotation speeds of the right and left main wheels 310 based on the sensed RPMs.

The position recognition module 220 may recognize a position of the robot cleaner based on information about an obstacle detected by the obstacle detector 700. Also, the position recognition module 220 may compensate for a recognized position of the robot cleaner, based on an obstacle detected using image information and the optical pattern sensor. The map creation module 230 may create a map using information about an obstacle detected by the obstacle detection unit, or may compensate for a created peripheral map.

The robot cleaner further includes a storage device 500 configured to store therein image information, obstacle information, position information, a peripheral map, etc. Referring to FIG. 5 or FIG. 6, the storage device 500 is configured to further store therein a cleaning map, a cleaning region, etc. The storage device 500 stores therein a control program for controlling the robot cleaner, and data associated with the control program. The storage device 500 may further store therein a cleaning type and a running type. As the storage device 500, a non-volatile memory (NVM, NVRAM) is mainly used. The NVM indicates a storage device capable of maintaining stored information even if power is not supplied thereto. The NVM includes a ROM, a flash memory, a magnetic computer memory device (e.g., a hard disk, a diskette drive, and a magnetic tape), an optical disk drive, a magnetic RAM, a PRAM, etc.

Referring to FIG. 6, the robot cleaner further includes a cleaning device 600 configured to draw dust or foreign materials into the robot cleaner. The cleaning device 600 includes a dust box configured to store therein collected dust particles, a suction fan configured to provide a driving power to suck dust within a cleaning region, and a suction motor configured to suck air by rotating the suction fan. The cleaning device 600 further includes an agitator rotatably mounted to a lower part of the body of the robot cleaner, and a side brush configured to clean a corner or an edge of a wall, etc. with rotating centering around a vertical shaft of the body. The agitator makes dust particles on the floor or a carpet move to the air with rotating centering around a horizontal shaft of the body of the robot cleaner. A plurality of blades are provided on an outer circumferential surface of the agitator in a spiral form. A brush may be provided between the blades.

Referring to FIG. 6, the robot cleaner may further include an input device 810, an output device 820 and a power device 830.

The robot cleaner may further include an input device 810 through which a user directly inputs a control command to the robot cleaner. The user may input, through the input device 810, a command instructing output of one or more information among information stored in the storage device 500. The input device 810 may be implemented as one or more buttons. For instance, the input device 810 may include an OK button and a set button. The OK button is used to input a command for checking obstacle information, position information, image information, a cleaning region, a cleaning map, etc. The set button is used to input a command for setting such information. The input device 810 may be provided with a reset button for inputting a command for resetting such information, a deletion button, a cleaning start button, a stop button, etc. As another example, the input device 810 may be provided with a button for setting reservation information, or a button for deleting reservation information. The input device 810 may be further provided with a button for setting a cleaning mode, or a button for changing a cleaning mode. The input device 810 may be further provided with a button for inputting a command instructing the robot cleaner to return to a charging station. As shown in FIG. 5, the input device 810 may be installed at an upper part of the robot cleaner, in the form of hard or soft keys, a touch pad, etc. The input device 810 may be implemented in the form of a touch screen together with the output device 820.

Referring to FIG. 5, the output device 820 is installed at an upper part of the robot cleaner. In this case, an installation position or an installation type may be variable. For instance, the output device 820 outputs, to a screen, reservation information, a battery state, intensive cleaning, space extension, a cleaning or running operation in a zigzag form, a cleaning operation with respect to a designated region, etc. The output device 820 may output the current cleaning state of the robot cleaner, and the current state of each unit of the robot cleaner. The output device 820 may display, on the screen, obstacle information, position information, image information, a cleaning map, a cleaning region, a designated region, etc. The output device 820 may be implemented as one of a light emitting diode (LED), a liquid crystal display (LCD), a plasma display panel (PDP), and an organic light emitting diode (OLED).

The power device 830 is provided with a chargeable battery to supply power into the robot cleaner. The power device 830 supplies, to each component as appropriate, a driving power and an operation power required when the robot cleaner moves or when the robot cleaner performs a cleaning operation. When the remaining amount of power is deficient, the robot cleaner moves to a charging station to be supplied with a charging current. The robot cleaner further comprises a battery sensor configured to sense a charged state of a battery, and to transmit detection information to the controller 200. As the battery is connected to the battery sensor, the remaining amount and a charged state of the battery are transmitted to the controller 200. The remaining amount of battery power may be displayed on the screen of the output device 820.

Figure 8:
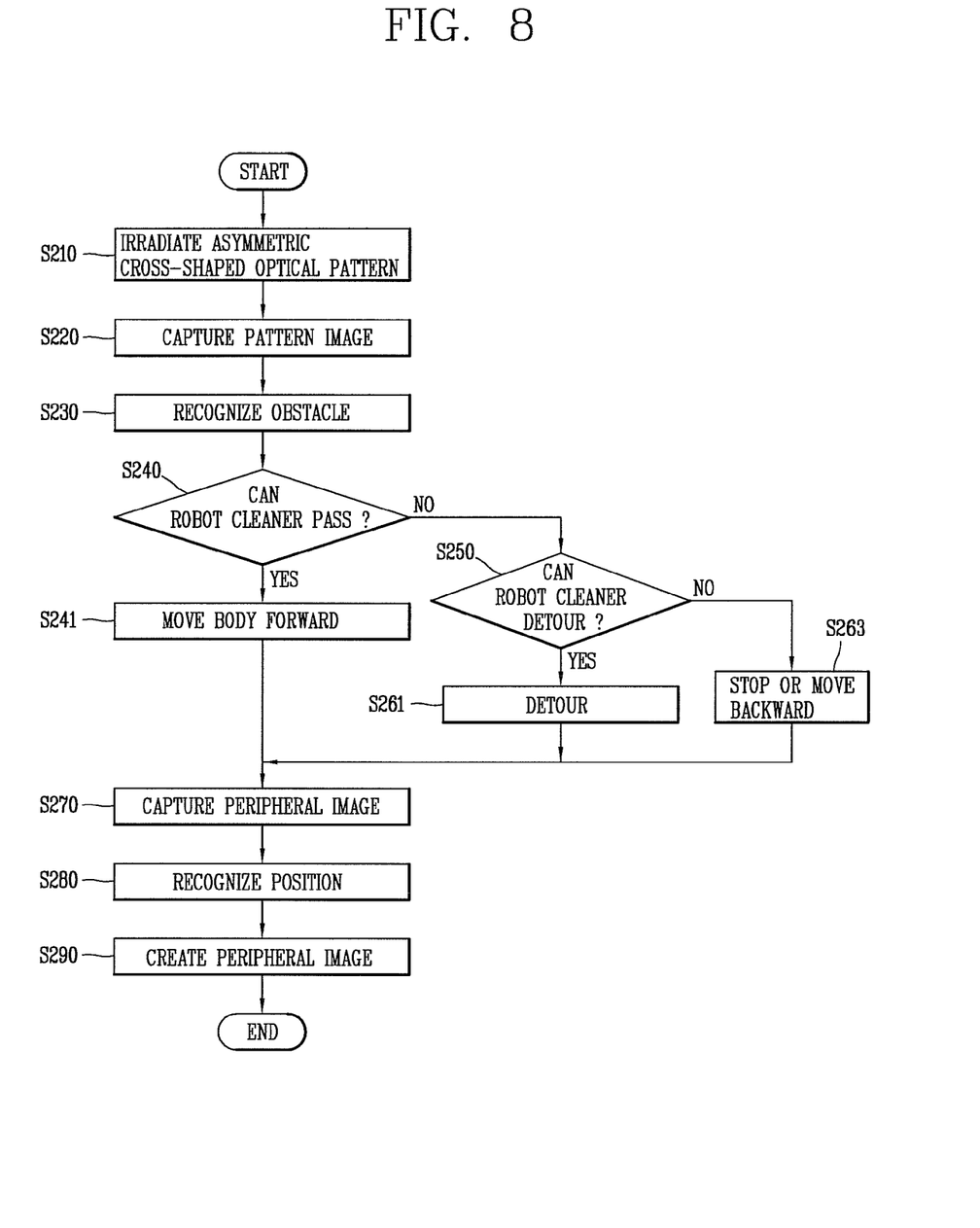

Referring to FIG. 8, the robot cleaner irradiates optical patterns while moving or in a stopped state (S210). As aforementioned, the optical pattern is preferably implemented as an asymmetric cross-shaped optical pattern. Then the robot cleaner captures a pattern image with respect to the optical pattern-irradiated region, thereby acquiring the pattern image (S220). Then the robot cleaner recognizes an obstacle using the pattern image (S230). Here, the robot cleaner recognizes an obstacle by processing the pattern image using a controller such as a micro computer. Alternatively, the optical pattern sensor itself may be configured to recognize an obstacle. For instance, the robot cleaner may recognize whether an obstacle exists or not, a width of an obstacle, a height of an obstacle, etc. based on a horizontal pattern. Further, the robot cleaner may detect a precise height of an obstacle based on a vertical pattern. The robot cleaner determines whether to pass through an obstacle or not, based on a recognition result with respect to the obstacle (S240). As shown in FIG. 3A, in case of a passable obstacle, the robot cleaner passes through the obstacle with its body moving forwardly (S241). As shown in FIG. 3B, in case of a passable threshold, the robot cleaner passes through the threshold with its body moving forwardly. If the robot cleaner cannot forward move, the robot cleaner determines whether to detour round the obstacle or not (S250). As shown in FIG. 3C, in case of an obstacle having a small gap, the robot cleaner detours a round the obstacle (S261). If the robot cleaner can neither move forward nor detour, the robot cleaner may stop or move back (S263). Such an algorithm may be variable according to a user or a programming, and a study function may be added according to a specification of the robot cleaner.

The robot cleaner may capture a peripheral image (S270), and may extract feature points from the peripheral image to thus recognize its position based on the feature points (S280). Then the robot cleaner may create a peripheral map based on the recognized position (S290).

A robot cleaner as embodied and broadly precisely detect a peripheral obstacle using a peculiar (unique) optical pattern. Especially, an asymmetric cross-shaped optical pattern may be irradiated, and a pattern image with respect to the optical pattern-irradiated region may be analyzed. When so configured, whether an obstacle exists or not may be checked, and a width or a height of an obstacle may be detected.

A robot cleaner as embodied and broadly described herein may perform operations such as a forward motion, a backward motion, a stopping motion and a detour motion, based on a detection result with respect to an obstacle.

A robot cleaner is provided that is capable of precisely detecting a peripheral obstacle using a peculiar optical pattern, and a method for controlling the same.

A robot cleaner is provided that is capable of detecting a width or a height of an obstacle by irradiating an asymmetric cross-shaped optical pattern, and by analyzing a pattern image with respect to the optical pattern-irradiated region, and capable of moving according to a detection result, and a method for controlling the same.

A robot cleaner as embodied and broadly described herein may include a body which forms an appearance; a cleaning unit including a dust box for storing collected dust, a suction fan for providing a driving force to suck dust inside a cleaning region, and a suction motor for sucking air by rotating the suction fan; an optical pattern sensor provided on a front surface of the body, and configured to irradiate an optical pattern and to output a pattern image; and a control unit configured to recognize an obstacle based on the pattern image, wherein the optical pattern sensor comprises: an optical source module configured to irradiate one or more cross-shaped optical patterns toward a front side of the body; and a camera module configured to capture the pattern image on the optical pattern-irradiated region.

The optical pattern sensor may be configured to irradiate an asymmetric cross-shaped optical pattern in which a horizontal length is longer than a vertical length.

The control unit may include an obstacle recognition module configured to recognize an obstacle by processing the pattern image.

A robot cleaner according to another embodiment may include a body which forms an appearance; a cleaning unit including a dust box for storing collected dust, a suction fan for providing a driving force to suck dust inside a cleaning region, and a suction motor for sucking air by rotating the suction fan; a driving unit provided with a wheel motor for driving one or more wheels installed below the body, and the driving unit configured to move the body according to a driving signal; an optical pattern sensor provided on a front surface of the body, configured to irradiate one or more cross-shaped optical patterns toward a front side of the body, and configured to output a pattern image; and a control unit configured to recognize an obstacle based on the pattern image, and configured to generate the driving signal based on a recognition result.

A robot cleaner as embodied and broadly described herein may precisely detect a peripheral obstacle using a peculiar optical pattern. Especially, an asymmetric cross-shaped optical pattern can be irradiated, and a pattern image with respect to the optical pattern-irradiated region can be analyzed. Under such configuration, whether an obstacle exists or not can be checked, and a width or a height of an obstacle can be detected.

A robot cleaner as embodied and broadly described herein may perform operations such as a forward motion, a backward motion, a stopping motion and a detour motion, based on a detection result with respect to an obstacle. This can enhance stability of the robot cleaner and a user's convenience, and improve a driving efficiency and a cleaning efficiency.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner, comprising:
    a body;
    a cleaning device operably coupled in the body and configured to draw dust from a cleaning region into the body;
    an optical pattern sensor provided on a front surface of the body and configured to irradiate an optical pattern and generate a corresponding pattern image; and
    a controller configured to recognize an obstacle based on the pattern image generated by the optical pattern sensor, wherein the optical pattern sensor includes:
        an optical source module configured to irradiate one or more optical patterns outward from a front side of the body;
        a camera module configured to capture the pattern image of a region irradiated by the one or more optical patterns; and
        a filter connected to a front end of the optical source module, and configured to pass at least a portion of the one or more optical patterns irradiated from the optical source module, wherein the portion of the one or more optical patterns is included in a prescribed frequency band, wherein the optical source module is configured to irradiate an asymmetric cross-shaped optical pattern having a horizontal pattern and a vertical pattern, wherein a length of the horizontal pattern is greater than a length of the vertical pattern, wherein the horizontal pattern and the vertical pattern are generated by the same optical source module and irradiated from a single point on a surface of the optical source module, wherein the controller includes an obstacle recognition module configured to process the pattern image to recognize the obstacle, and wherein the obstacle recognition module recognizes a height of the obstacle using the vertical pattern and the horizontal pattern of the pattern image, determines a position of the horizontal pattern from the pattern image when no obstacle is present, calculates a moving distance of the position of the horizontal pattern when the obstacle is present, and recognizes the height of the obstacle by the moving distance.

2. The robot cleaner of claim 1, further including an image detector configured to capture a peripheral image and to output corresponding image information.

3. The robot cleaner of claim 2, wherein the controller includes a position recognition module configured to recognize a position of the robot cleaner within the clearing region using the image information.

4. The robot cleaner of claim 3, wherein the controller further includes a map module configured to generate a peripheral map using the recognized position of the robot cleaner.

5. The robot cleaner of claim 1, wherein the obstacle recognition module recognizes a width of the obstacle using the horizontal pattern of the pattern image.

6. The robot cleaner of claim 1, further including an input that receives an input from a user for operation of the robot cleaner.

7. The robot cleaner of claim 1, further including an output that outputs information of the robot cleaner.

8. A robot cleaner, comprising:
a body;
a cleaning device operably coupled in the body and configured to draw debris from a cleaning region into the body;
a driver including a wheel motor configured to drive one or more wheels installed at a lower portion of the body, wherein the driver is configured to move the body in response to a drive signal;
an optical pattern sensor provided on a front surface of the body and configured to irradiate one or more cross-shaped optical patterns outward from a front side of the body and to generate a corresponding pattern image; and
a controller configured to recognize an obstacle in a moving path of the robot cleaner based on the pattern image, and to generate the drive signal based on recognition of the obstacle, wherein the optical pattern sensor is configured to irradiate an asymmetric cross-shaped optical pattern including a horizontal pattern having a horizontal length and a vertical pattern having a vertical length, wherein the horizontal length is greater than the vertical length, wherein the optical pattern sensor includes:
an optical source module configured to irradiate the asymmetric cross-shaped optical pattern outward from the front side of the body;
a camera module configured to capture the pattern image of a region irradiated by the optical pattern, wherein the camera module is provided below the optical source module; and
a filter connected to a front end of the optical source module, and configured to pass at least a portion of the one or more cross-shaped optical patterns irradiated from the optical source module, wherein the portion of the one or more cross-shaped optical patterns is included in a prescribed frequency band, wherein the controller includes an obstacle recognition module configured to process the pattern image to recognize the obstacle, wherein the obstacle recognition module recognizes a height of the obstacle using the vertical pattern and the horizontal pattern of the pattern image, determines a position of the horizontal pattern from the pattern image when no obstacle is present, wherein the horizontal pattern and the vertical pattern are generated by the same optical source module and irradiated from a single point on a surface of the optical source module, calculates a moving distance of the position of the horizontal pattern when the obstacle is present, and recognizes the height of the obstacle by the moving distance.

9. The robot cleaner of claim 8, wherein the optical pattern sensor further includes an image processing module configured to detect an obstacle by processing the pattern image.

10. The robot cleaner of claim 8, wherein the controller generates the drive signal corresponding to one of a forward motion, a backward motion, a stopping moon, or a detour motion of the body, based on recognition of the obstacle in the moving path of the robot cleaner.

11. The robot cleaner of claim 8, wherein the controller recognizes a width of the obstacle using the horizontal pattern of the pattern image.

12. A method for controlling a robot cleaner including a body, a cleaning device configured to draw debris into the body, and an optical pattern sensor configured to irradiate an optical pattern and output a corresponding pattern image, the method comprising:
irradiating an optical pattern outward from a front side of the body toward a cleaning region;
filtering at least a portion of the optical pattern irradiated from the optical source sensor, wherein the portion of the optical pattern is included in a prescribed frequency band;
capturing a pattern image from a region irradiated by the optical pattern; and
recognizing an obstacle in a moving path of the robot cleaner based on the captured pattern image, wherein the optical pattern is an asymmetric cross-shaped optical pattern and includes one or more horizontal patterns and one or more vertical patterns, wherein the horizontal pattern and the vertical pattern are generated by the same optical source sensor and irradiated from a single point on a surface of the optical source sensor, wherein a length of the horizontal pattern is greater than a length of the vertical pattern, wherein the obstacle is recognized using a change in shape of the pattern image, and wherein the recognizing of the obstacle includes:
recognizing a height of the obstacle using the vertical pattern and the horizontal pattern of the pattern image;
determining a position of the horizontal pattern from the pattern image when no obstacle is present;
calculating a moving distance of the position of the horizontal pattern when the obstacle is present; and
recognizing the height of the obstacle by the moving distance.

13. The method of claim 12, further including:
capturing a peripheral image and acquiring corresponding image information; and
recognizing a position of the robot cleaner in the cleaning region based on the captured peripheral image.

14. The method of claim 13, further including generating a peripheral map based on the acquired image information.

15. The method of claim 12, further including:
determining whether the robot cleaner can pass through the obstacle or not; and
performing one of a forward motion, a detour motion, a stopping motion, or a backward motion, based on a result of the determination.

16. The method of claim 12, wherein the recognizing the obstacle includes recognizing a width of the obstacle using the horizontal pattern.

* * * * *